United States Patent
Wang

(10) Patent No.: US 9,879,991 B2
(45) Date of Patent: Jan. 30, 2018

(54) DEVICE AND METHOD FOR DETECTING LEVEL DEGREE OF OVERHEAD CONVEYOR

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventor: Hao Wang, Beijing (CN)

(73) Assignees: BOE TECHNOLOGY GROUP CO., LTD. (CN); HEFEI XINSHENG OPTOELECTRONICS TECHNOLOGY CO., LTD. (CN)

(*) Notice: Subject to any disclaimer, the term of this patent is extended or adjusted under 35 U.S.C. 154(b) by 129 days.

(21) Appl. No.: 15/096,789

(22) Filed: Apr. 12, 2016

(65) Prior Publication Data

US 2016/0363444 A1 Dec. 15, 2016

(30) Foreign Application Priority Data

Jun. 9, 2015 (CN) .......................... 2015 1 0320133

(51) Int. Cl.
*G01C 9/06* (2006.01)
*G08B 21/18* (2006.01)

(52) U.S. Cl.
CPC ............. *G01C 9/06* (2013.01); *G08B 21/187* (2013.01); *G01C 2009/066* (2013.01)

(58) Field of Classification Search
CPC .................................. G01C 9/06; G08B 21/187
(Continued)

(56) References Cited

U.S. PATENT DOCUMENTS

| 5,798,828 A * | 8/1998 | Thomas | G01B 11/26 33/286 |
| 2002/0092193 A1* | 7/2002 | DeCecca | B23Q 7/1426 33/613 |

(Continued)

FOREIGN PATENT DOCUMENTS

| CN | 1763906 A | 4/2006 |
| CN | 204007521 U | 12/2014 |
| TW | 201514076 A | 4/2015 |

OTHER PUBLICATIONS

Office Action in Chinese Patent Application No. 201510320133.1, dated Oct. 9, 2016.

*Primary Examiner* — G. Bradley Bennett
(74) *Attorney, Agent, or Firm* — Brooks Kushman P.C.

(57) ABSTRACT

The present disclosure provides a device and a method for detecting a level degree of an OHCV. The device may include a laser beam transmission unit, at least one baffle, a laser beam reception unit, and a controller. The laser beam transmission unit, the baffle and the laser beam reception unit may be sequentially arranged at an identical horizontal level inside the OHCV. The at least one baffle may be provided with a via-hole. The laser beam transmission unit may be configured to generate a laser beam through the via-hole and toward the laser beam reception unit. The laser beam reception unit may be configured to receive the laser beam and transmit information about the received laser beam to the controller. The controller may be configured to monitor the real-time information about the laser beam. According to the present disclosure, it is able to conveniently detect the level degree of the OHCV, effectively reduce the workload of an inspector and enable the inspector to inspect the OHCV without entering an interior of the OHCV, thereby to prevent the normal operation and the cleanliness of the OHCV from being adversely affected.

20 Claims, 2 Drawing Sheets

(58) Field of Classification Search
USPC .................................................. 33/228, 286
See application file for complete search history.

(56) References Cited

U.S. PATENT DOCUMENTS

| | | |
|---|---|---|
| 2002/0197136 A1 | 12/2002 | Huang et al. |
| 2004/0261278 A1* | 12/2004 | Bodgren ................. F02B 67/06 33/286 |
| 2008/0228441 A1* | 9/2008 | Lugtenburg ........... G01B 21/20 702/167 |
| 2010/0251558 A1* | 10/2010 | Franzen ................. G01B 5/201 33/550 |
| 2016/0041359 A1* | 2/2016 | Gaskin ................. G01B 11/272 250/573 |
| 2017/0089425 A1* | 3/2017 | Wang ........................ F16G 3/08 |

* cited by examiner

DEVICE AND METHOD FOR DETECTING LEVEL DEGREE OF OVERHEAD CONVEYOR

CROSS-REFERENCE TO RELATED APPLICATION

The application claims the benefit and priority of a Chinese Patent Application No. 201510320133.1 filed on Jun. 9, 2015, the disclosure of the above application is incorporated herein by reference.

FIELD

The present disclosure relates to the field of display technology, in particular to a device and a method for detecting a level degree of an overhead conveyor (OHCV).

BACKGROUND

This section provides background information related to the present disclosure which is not necessarily prior art.

Currently, in the field of Thin Film Transistor-Liquid Crystal Display (TFT-LCD), in one way, a degree of firmness of a boom may usually be detected by an inspector at an upper interlayer of an OHCV, so as to detect whether or not the OHCV is at a horizontal level or has been sunken. At this time, the inspector may be at an intensive workload and may not find the fault. In addition, due to the frequent inspection, hermeticity of a Fan Filter Unit (FFU) filter at a top of the OHCV will be adversely affected, resulting in leakage at the FFU. Further, in another way, the inspector may enter an interior of the OHCV so as to measure a level degree of he OHCV by a laser level meter. However, at this time, a normal operation of the OHCV well as the cleanliness thereof will be adversely affected.

SUMMARY

This section provides a general summary of the disclosure, and is not a comprehensive disclosure of its full scope or all of its features.

(1) Technical Problem To Be Solved

An object of the present disclosure is to facilitate the detection and prevent the cleanliness from being adversely affected during the detection of a level degree of a conventional OHCV in the case that the inspector does not enter the interior of the OHCV.

(2) Technical Solutions

In one aspect, the present disclosure provides in some embodiments a device for detecting a level degree of an OHCV, including a laser beam transmission unit, at least one baffle, a laser beam reception unit, and a controller. The laser beam transmission unit, the baffle and the laser beam reception unit may be sequentially arranged at an identical horizontal level inside the OHCV. The at least one baffle may be provided with a via-hole. The laser beam transmission unit may be configured to generate a laser beam transmitted through the via-hole and directed toward the laser beam reception unit. The laser beam reception unit may be configured to receive the laser beam and transmit information about the received laser beam to the controller. The controller may be configured to monitor the real-time information about the laser beam.

Alternatively, the OHCV may include a clean chamber and a hanging unit configured to hang the clean chamber in the air. The laser beam transmission unit, the at least one baffle and the laser beam reception unit may be sequentially secured onto a bottom plate of the clean chamber.

Alternatively, the hanging unit may include a hanging keel fixedly arranged above the clean chamber, and a boom through which the hanging keel may be connected to the clean chamber.

Alternatively, when the clean chamber is of a length L less than or equal to 6 $m$, the number N of the baffles may be one.

Alternatively, when the clean chamber is of a length L greater than 6 m, the number N of the baffles satisfies an equation N=[(L-6)/4]+1, where sign [] represents a round-down operation and N is a positive integer.

Alternatively, a bracket may be arranged under each of the laser beam transmission unit, the baffle and the laser beam reception unit, so as to adjust a height of each of the laser beam transmission unit, the baffle and the laser beam reception unit.

Alternatively, the controller may include a control unit connected to the laser beam transmission unit and the laser beam reception unit, and an alarm unit connected to the control unit and configured to send an alarm when a fault occurs for the OHCV.

Alternatively, the laser beam transmission unit may be a transmitting end of a laser sensor, the laser beam reception unit may be a receiving end of another laser sensor, and the two laser sensors may be both connected to the controller.

Alternatively, the via-hole may be of a diameter within a range of 1 to 3 cm.

Alternatively, the controller may be a Programmable Logic Controller (PLC).

In another aspect, the present disclosure provides in some embodiments a method for detecting a level degree of an OHCV using the above-mentioned device, including steps of: providing the laser beam transmission unit, the at least one baffle and the laser beam reception unit sequentially in the OHCV and at an identical horizontal level; enabling the laser beam transmission unit so as to generate a laser beam transmitted through a via-hole in the at least one baffle and directed toward the laser beam reception unit, enabling the laser beam reception unit to receive the laser beam and transmitting information about the received laser beam to the controller; and displaying the real-time information about the received laser beam by the controller, and determining a level degree of the OHCV in accordance with the presence or absence of the information about the received laser beam. The step of determining the level degree of the OHCV in accordance with the presence or absence of the information about the received laser beam may include; when the information about the received laser beam disappears suddenly, determining that a fault occurs for the OHCV and it is necessary to adjust the level degree of the OHCV and the information about the received laser beam exists all the time, determining that the OHCV operates normally and it is unnecessary to adjust the level degree of the OHCV.

(3) Beneficial Effect

According to the embodiments of the present disclosure, the device may be used to conveniently monitor the real-time level degree of the OHCV through the laser beam transmission unit, the at least one baffle, the laser beam reception unit and the controller. As a result, it is able to effectively reduce the workload of the inspector and enable the inspector to inspect the OHCV without entering the interior of the OHCV, thereby to prevent the normal operation and the cleanliness of the OHCV from being adversely affected, detect the real-time deformation of the OHCV or the real-time loosening of the boom, and prevent the device from being damaged.

Further aspects and areas of applicability will become apparent from the description provided herein. It should be understood that various aspects of this disclosure may be implemented individually or combination with one or more other aspects. It should also be understood that the description and specific examples herein are intended for purposed of illustration only and are not intended to limit the scope of the present disclosure

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

Figure 1:
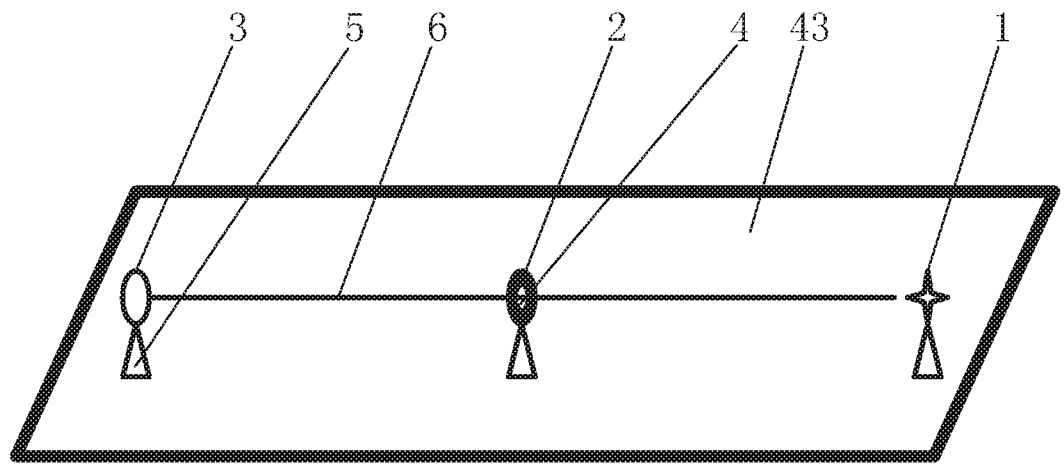
FIG. 1 is a schematic view showing a device for detecting a level degree of an OHCV according to a first embodiment of the present disclosure.

REFERENCE SIGN LIST 1 laser beam transmission unit
2 baffle
3 laser beam reception unit
4 via-hole
5 bracket
6 laser beam
41 clean chamber
42 hanging unit
43 bottom plate
421 hanging keel
422 boom

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 2:
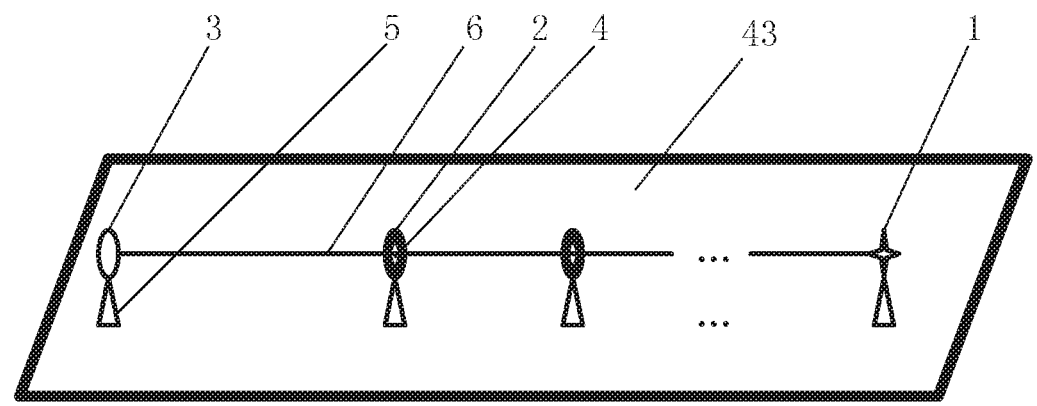
FIG. 2 is another schematic view showing the device for detecting a level degree of an OHCV according to a second embodiment of the present disclosure.
Figure 3:
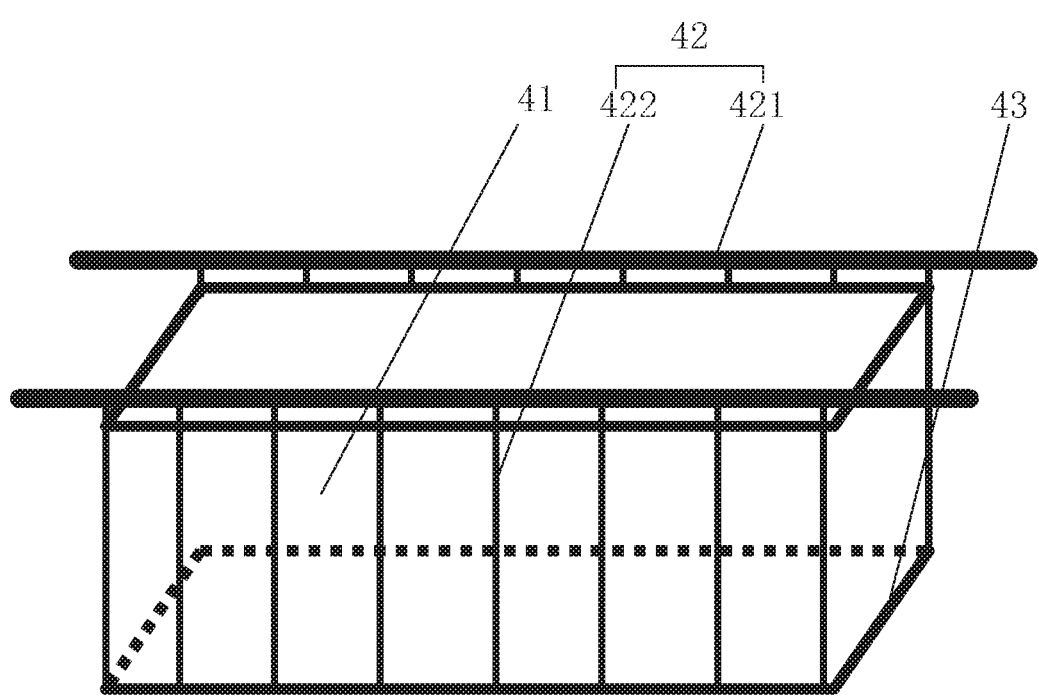
FIG. 3 is a schematic view showing the OHCV according to one embodiment of the present disclosure.

As shown in FIGS. 1 to 3, the present disclosure provides in some embodiments a device for detecting a level degree of an OHCV, which includes a laser beam transmission unit 1, at least one baffle 2, a laser beam reception unit 3, and a controller (not shown). The laser beam transmission unit 1, the at least one baffle 2 and the laser beam reception unit 3 are sequentially arranged at an identical horizontal level inside the OHCV. The at least one baffle 2 is provided with a via-hole 4. Alternatively, the via-hole 4 is of a diameter within a range of 1 to 3 cm. The laser beam transmission unit 1 is configured to generate a laser beam 6 transmitted through the via-hole 4 and directed toward the laser beam reception unit 3. The laser beam reception unit 3 is configured to receive the laser beam 6 and transmit information about the received laser beam to the controller. The controller is configured to monitor the real-time information about the laser beam from the laser beam reception unit 3. When the information about the laser beam disappears suddenly, the controller determines that a fault occurs for the OHCV and it is necessary to adjust the level degree of the OHCV. When the information about the laser beam exists all the time, the controller determines that the OHCV operates normally and it is unnecessary to adjust the level degree thereof.

According to the device in the embodiments of the present disclosure, it is able to monitor real-time level degree of the OHCV, effectively reduce the workload of an inspector and enable the inspector to inspect the OHCV without entering the interior of the OHCV, thereby to prevent the normal operation and the cleanliness of the OHCV from being adversely affected.

As shown in FIG. 3, the OHCV includes a clean chamber 41 and a hanging unit 42 configured to hang the clean chamber 41 in the air. The laser beam transmission unit 1, the at least one baffle 2 and the laser beam reception unit 3 are sequentially secured onto a bottom plate 43 of the clean chamber 41. Of course, a transmission unit for conveying a substrate and an FFU are also arranged in the clean chamber 41.

The hanging unit 42 includes a hanging keel 421 and a boom 422. The hanging keel 421 is fixedly arranged above the clean chamber 41, i.e., it is fixedly arranged in the air and above the clean chamber 41. The hanging keel 421 is connected to the clean chamber 41 through the boom 422, so as to hang the clean chamber 41 in the air.

It should be appreciated that, the device for detecting the level degree may not only be applied to the OHCV but also to any other system whose level degree needs to be detected.

Further, as described hereinafter, a shape and the number of the baffle 2 may be set according to the practical need.

FIRST EMBODIMENT

As shown in FIG. 1, in this embodiment, there is only one baffle 2. When the clean chamber 41 is of a length L less than or equal to 6 m, i.e., when the bottom plate 43 of the clean chamber 41 is less than or equal to 6 m, the number of the baffle 2 is one. At this time, the laser beam transmission unit 1, the baffle 2 and the laser beam reception unit 3 are located at an identical horizontal level and spaced apart from each other along a lengthwise direction of the bottom plate 43.

The baffle 2 is arranged between the laser beam transmission unit 1 and the laser beam reception unit 3, and all these three elements are arranged along a straight line, so as to provide an appropriate spatial arrangement.

SECOND EMBODIMENT

As shown in FIG. 2, in this embodiment, there are at least two baffles 2. The laser beam transmission unit 1, the at least two baffles 2 and the laser beam reception unit 3 are arranged at an identical horizontal level. When the clean chamber is of a length L greater than 6 m, the number N of the baffles satisfies an equation $N=[L-6)/4]+1$, here sign [ ] represents a round-down operation and N is a positive integer According to this equation, when the length of the clean chamber 41 is greater than 6$m$, one additional baffle 2 needs to be provided each time the length of the clean chamber is increased by 4 m. For example, when the length L of the clean chamber 41 is 10 m, the number N of the baffles is 2.

In addition, a bracket 5 is arranged on the b nom plate 43 of the clean chamber 41 and under each of the laser beam transmission unit 1, the baffle 2 and the laser beam reception unit 3, so as to adjust a height of each of the laser beam transmission unit 1, the baffle 2 and the laser beam reception unit 3, thereby to enable them at an identical horizontal level. In other words, the laser beam transmission unit 1, the baffle 2 and the laser beam reception unit 3 are initially arranged at an identical horizontal level. This is because, in a normal case, the laser beam 6 may be transmitted through the via-hole 4 and directed toward the laser beam reception unit 3, but once the OHCV is in an oblique state or deformed, the laser beam 6 may not be transmitted through the via-hole 4 and thereby may not be directed toward the laser beam reception unit 3.

In this embodiment, the controller includes a control unit and an alarm unit. The control unit is connected to the laser beam transmission unit 1 and the laser beam reception unit 3, and configured to enable the laser beam transmission unit 1 to generate the laser beam and configured to monitor the information about the laser beam from the laser beam reception unit 3. The alarm unit is connected to the control unit, and configured to send an alarm when a fault occurs for the OHCV. When the fault of level degree occurs for the OHCV, the alarm may send the alarm signal (i.e., a visual prompt on a monitoring interface or a sound prompt). Of course, the controller may be of any other structure, as long as it may monitor the entire device. For example, the controller may be a PLC, so as to improve the degree of automation.

Alternatively, the laser beam transmission unit is a transmitting end of a laser sensor, the laser beam reception unit is a receiving end of another laser sensor, and the two laser sensors are both connected to the controller, so as to facilitate the control. The laser sensor is a sensor capable of performing the measurement using a laser technology, and it consists of a laser (the transmitting end), a detector (the receiving end) and a measurement circuit connected to the controller. As a novel measuring the laser sensor may be used to perform contactless, remote measurement rapidly and accurately, with a large measurement range and strong resistance to optical/electrical interference.

The present disclosure further provides in some embodiments a method for detecting a level degree of the OHCV using the above-mentioned device, which includes the following steps.

Step S1: providing the laser beam transmission unit, the at least one baffle and the laser beam reception unit sequentially in the OHCV and at an identical horizontal level. According to the practical need, one or more baffles may be provided, To be specific, when the length L of the clean chamber 41 is less than or equal to 6 m, the number N of the baffle 2 is one. When the length L or the clean chamber 41 is greater than 6 m, the number N of the baffles 2 satisfies an equation $N=[(L6)/4]+1$. When there are more than one baffles 2, the laser beam transmission unit, the baffles and the laser beam reception unit 1 are also arranged at an identical horizontal level.

Step S2: enabling the laser beam transmission unit so as to generate a laser beam transmitted through a via-hole in the at least one baffle and directed toward the laser beam reception unit, enabling the laser beam reception unit to receive the laser beam and transmitting information about the received laser beam to the controller.

Step S3: displaying the real-time information about the received laser beam by the controller, and determining a level degree of the OHCV in accordance with the presence or absence of the information about the received laser beam. The step of determining the level degree of the OHCV in accordance with the presence or absence of the information about the received laser beam includes: when the information about the received laser beam disappears suddenly, determining that a fault occurs for the OHCV (e.g., the OHCV is deformed or the boom is loosen) and it is necessary to adjust the level degree of the OHCV, and when the information about the received laser beam exists all the time, determining that the OHCV operates normally and it is unnecessary to adjust the level degree of the OHCV.

Further, when the fault of the level degree occurs for the OHCV, the method further includes sending an alarm (e.g., a visual prompt on a monitoring interface or a sound prompt) by an alarm unit. At this time, the inspector needs to enter the OHCV to determine the level degree and detect whether or not the boom is loosen, and then make appropriate adjustment according to the practical need. In this way, it is able to detect the real-time deformation of the OHCV and the real-time loosening of the boom, thereby to prevent the device from being damaged.

In a word, the device may be used to conveniently monitor the real-time level degree of e OHCV through the laser beam transmission unit, the at least one baffle, the laser beam reception unit and the controller. As a result, it is able to effectively reduce the workload of the inspector and enable the inspector to inspect the OHCV without entering the interior of the OHCV, thereby to prevent the normal operation and the cleanliness of the OHCV from being adversely affected, detect the real-time deformation of the OHCV or the real-time loosening of the boom, and prevent the device from being damaged.

The forgoing description of the embodiments has been provided for purposed of illustration and description. It is not intended to be exhaustive or to limit to that particular embodiment, but, where applicable, are interchangeable and can be used in a selected embodiment, even of not specifically shown or described. The same may also be varied in many ways. Such variations are not to be regarded as a departure from the disclosure, and all such modifications are intended to be included within the scope of the disclosure.

What is claimed is:

1. A device for detecting a level degree of an Overhead Conveyor (OHCV), comprising a laser beam transmission unit, at least one baffle, a laser beam reception unit, and a controller, wherein the laser beam transmission unit, the baffle and the laser beam reception unit are sequentially arranged at an identical horizontal level inside the OHCV;

the at least one baffle is provided with a via-hole;

the laser beam transmission unit is configured to generate a laser beam through the via-hole and toward the laser beam reception unit;

the laser beam reception unit is configured to receive the laser beam and transmit information about the received laser beam to the controller; and the controller is configured to monitor the real-time information about the laser beam.

2. The device according to claim 1, wherein the OHCV comprises a clean chamber and a hanging unit configured to hang the clean chamber in the air; and wherein the laser beam transmission unit, the at least one baffle and the laser beam reception unit are sequentially secured onto a bottom plate of the clean chamber.

3. The device according to claim 2, wherein the hanging unit comprises a hanging keel fixedly arranged above the clean chamber, and a boom through which the hanging keel is connected to the clean chamber.

4. The device according to claim 2, wherein when the clean chamber is of a length L less than or equal to 6 m, the number N of the baffles is one.

5. The device according to claim 2, wherein when the clean chamber is of a length L greater than 6$m$, the number N of the baffles satisfies an equation $N=[(L-6)/4]+1$, where sign [ ] represents around-down operation and N is a positive integer.

6. The device according to claim 1, wherein a bracket is arranged under each of the laser beam transmission unit, the baffle and the laser beam reception unit, so as to adjust a height of each of the laser beam transmission unit, the baffle and the laser beam reception unit.

7. The device according to claim 1, wherein the controller comprises a control unit connected to the laser beam transmission unit and the laser beam reception unit, and an alarm unit connected to the control unit and configured to send an alarm when a fault occurs for the OHCV.

8. The device according to claim 1, wherein the laser beam transmission unit is a transmitting end of a laser sensor, the laser beam reception unit is a receiving end of another laser sensor, and the two laser sensors are both connected to the controller.

9. The device according to claim 1, wherein e via-hole is of a diameter within a range of 1 to 3 cm.

10. The device according to claim 1, wherein the controller is a Programmable Logic Controller (PLC).

11. A method for detecting a level degree of an Overhead Conveyor (OHCV) using a device for detecting the level degree of the OHCV, wherein the device comprises a laser beam transmission unit, at least one baffle, a laser beam reception unit, and a controller; wherein the laser beam transmission unit, the baffle and the laser beam reception unit are sequentially arranged at an identical horizontal level inside the OHCV; wherein the at least one baffle is provided with a via-hole; wherein the laser beam transmission unit is configured to generate a laser beam through the via-hole and toward the laser beam reception unit; wherein the laser beam reception unit is configured to receive the laser beam and transmit information about the received laser beam to the controller; and wherein the controller is configured to monitor the real-time information about the laser beam, the method comprising steps of:

providing the laser beam transmission unit, the at least one baffle and the laser beam reception unit sequentially in the OHCV and at an identical horizontal level;

enabling the laser beam transmission unit so as to generate a laser beam through a via-hole in the at least one baffle and toward the laser beam reception unit, enabling the laser beam reception it so as to receive the laser beam and transmitting information about the received laser beam to the controller; and displaying the real-time information about the received laser beam by the controller, and determining a level degree of the OHCV in accordance with the presence or absence of the information about the received laser beam, wherein the step of determining the level degree of the OHCV in accordance with the presence or absence of the information about the received laser beam comprises: when the information about the received laser beam disappears suddenly, determining that a fault occurs for the OHCV and it is necessary to adjust the level degree of the OHCV, and when the information about the received laser beam exists all the time, determining that the OHCV operates normally and it is unnecessary to adjust the level degree of the OHCV.

12. The method according to claim 11, wherein the OHCV comprises a clean chamber and a hanging unit configured to hang the clean chamber in the air; and wherein the laser beam transmission unit, the at least one baffle and the laser beam reception unit are sequentially secured onto a bottom plate of the clean chamber.

13. The method according to claim 12, wherein the hanging unit comprises a hanging keel fixedly arranged above the clean chamber, and a boom through which the hanging keel is connected to the clean chamber.

14. The method according to claim 12, wherein when the clean chamber is of a length L less than or equal to 6 m, the number N of the baffles is one.

15. The method according to claim 12, wherein when the clean chamber is of a length L greater than 6 m, the number N of the baffles satisfies an equation $N=[(L-6)/4]+1$, where sign [ ] represents around-down operation and N is a positive integer.

16. The method according to claim 11, wherein a bracket is arranged under each of the laser beam transmission unit, the baffle and the laser beam reception unit, so as to adjust a height of each of the laser beam transmission unit, the baffle and the laser beam reception unit.

17. The method according to claim 11, wherein the controller comprises a control unit connected to the laser beam transmission unit and the laser beam reception unit, and an alarm unit connected to the control unit and configured to send an alarm when a fault occurs for the OHCV.

18. The method according to claim 11, wherein the laser beam transmission unit is a transmitting end of a laser sensor, the laser beam reception unit is a receiving end of another laser sensor, and the two laser sensors are both connected to the controller.

19. The method according to claim 11, wherein the via-hole is of a diameter within a range of 1 to 3 cm.

20. The method according to claim 11, wherein the controller is a Programmable Logic Controller (PLC).

* * * * *

UNITED STATES PATENT AND TRADEMARK OFFICE
CERTIFICATE OF CORRECTION

PATENT NO. : 9,879,991 B2  
APPLICATION NO. : 15/096789  
DATED : January 30, 2018  
INVENTOR(S) : Hao Wang et al.

Page 1 of 1

It is certified that error appears in the above-identified patent and that said Letters Patent is hereby corrected as shown below:

In the Claims

Column 7, Line 46, Claim 9:
After "according to claim 1, wherein"
Delete "e" and
Insert -- the --.

Column 8, Line 7, Claim 11:
After "enabling the reception beam reception"
Delete "it" and
Insert -- unit --.

Column 8, Line 43, Claim 15:
After "represents"
Delete "around" and
Insert -- a round --.

Signed and Sealed this  
Nineteenth Day of June, 2018

Andrei Iancu  
*Director of the United States Patent and Trademark Office*